July 3, 1928.
M. E. REAGAN
1,675,381
AUTOMATIC HYDROELECTRIC STATION
Filed Oct. 15, 1923
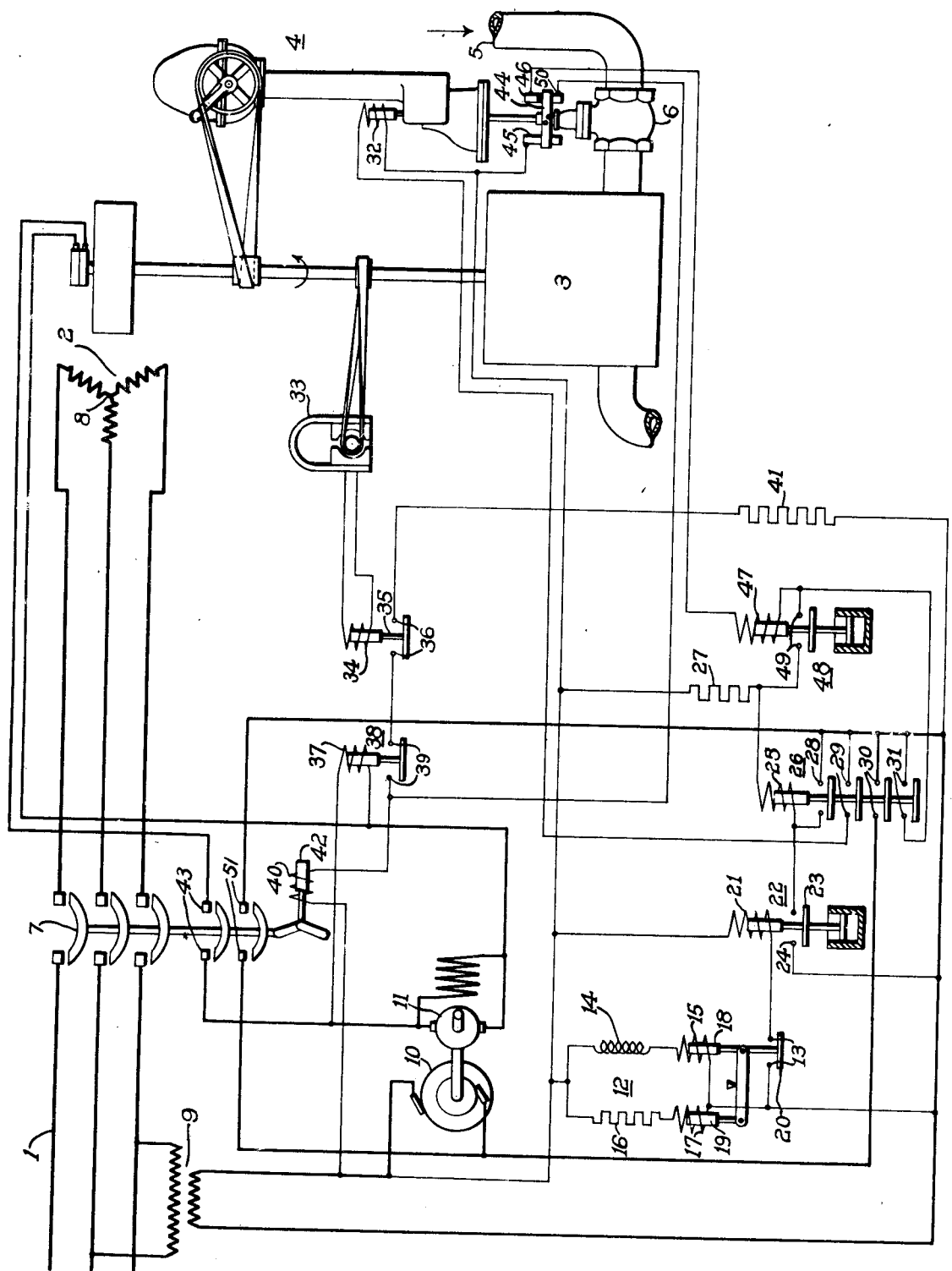
WITNESSES:
INVENTOR
Maurice E. Reagan
BY
ATTORNEY Patented July 3, 1928.

1,675,381

UNITED STATES PATENT OFFICE.

MAURICE E. REAGAN, OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC HYDROELECTRIC STATION.

Application filed October 15, 1923. Serial No. 668,516.

My invention relates to automatic stations and particularly to automatic hydro-electric generating stations.

One object of my invention is to provide an automatic station of the above-indicated character that shall have a system of relays for automatically initiating the operation of the station apparatus in response to certain conditions in a distribution circuit.

Another object of my invention is to provide means whereby the station apparatus shall be taken out of service when the prime mover is operating below its range of relatively high efficiency.

Another object of my invention is to provide means whereby the station apparatus shall be disconnected from the distribution circuit when substantially no energy is passing therebetween.

A further object of my invention is to provide a station of the above-indicated character that shall be reliable in its operation and simple and economical in its construction.

In practicing my invention, I provide an alternating-current distribution circuit, a generator for supplying energy thereto, a prime mover for the generator, a supply of energy for driving the prime mover and relay means for controlling the operation of the prime mover and the generator and the connection of the generator to the distribution circuit.

The single figure of the accompanying drawings is a diagrammatic representation of a system in which the apparatus embodying my invention is used.

An electrical system embodying my invention comprises, in general, an alternating-current distribution circuit 1, a generator 2, a water-wheel 3, and a governor 4 for controlling the operation of the water-wheel 3. Fluid energy for operating the water-wheel 3 is supplied to a pipe 5 and passes through a gate valve 6 to the water-wheel 3. A circuit interrupter 7 is provided for controlling the connection of armature windings 8 of the generator 2 to the distribution circuit 1. A transformer 9 supplies energy for the operation of the controlling relays and of a motor 10 that drives an exciter 11 for the field-magnet windings of the generator 2.

With the station apparatus in its inoperative condition, the circuit interrupter 7 is in its open position, as shown in the diagram. The primary winding of the transformer 9 is energized, however, from one phase of the distribution circuit 1, it being understood that the circuit 1 is connected also to other sources of energy. Suppose now that the frequency of alternations of voltage in the distribution circuit 1 has been decreased below a predetermined value, because of a decrease in speed of the other generators supplying energy to the distribution circuit 1 which would be caused by loading them beyond their capacity.

The movable member of a frequency relay 12 that is held in the position shown in the diagram at normal frequencies in the distribution circuit 1 is now actuated to effect engagement of contact members 13 because a reactor 14 in circuit with a winding 15 of the relay permits an increased current to traverse the circuit extending from the secondary coil of the transformer 9, at the lower frequency, while the current traversing a non-inductive resistor 16 and an operating coil 17 is unchanged by the reduction of frequency in the distribution circuit 1. An armature member 18 is thereby attracted more strongly by the coil 15 than is an armature member 19 by the operating coil 17, to cause a bridging member 20 to effect engagement of the contact members 13 and complete a circuit extending through the secondary winding of the transformer 9 and the operating coil 21 of a time-element relay 22.

If the reduced frequency in the distribution circuit 1 persists for a predetermined interval of time, the coil 21 will be energized long enough to permit a bridging member 23 to engage stationary contact members 24. When the contact members 24 are thus engaged, the operating coil 25 of a master relay 26 will be energized by current traversing the circuit extending through the secondary winding of the transformer 9, a resistor 27, the operating coil 25, and contact members 23 and 24.

This causes the relay 26 to effect engagement of contact members 28, 29, 30 and 31, respectively. When the contact members 28 are engaged, the contact members 24 are so shunted thereby as to maintain energization of the coil 25 after the coil 21 is de-energized and the contact members 24 are thereby de-energized. Engagement of the contact members 29 completes a circuit extending through the secondary winding of the transformer 9 and a solenoid winding 32 of the governor 4.

This governor is of a well known type in which a valve that is controlled by the solenoid winding 32, when open, permits the governor to open the gate valve 6 to start the water-wheel 3 in operation. The gate valve 6 is so controlled by the governor 4 as to maintain the speed of the water-wheel 3 and the generator 2 at a predetermined value.

When this predetermined speed is reached, the voltage generated by the magneto 33, which is directly proportional to the speed of the water-wheel and the generator, will be such as to energize an operating coil 34 of a speed-indicating relay 35 with sufficient strength to effect engagement of its contact members 36.

When the contact members 30 are engaged, a circuit is thereby completed extending through the secondary winding of the transformer 9 and the motor 10. The motor 10 thus starts and brings the exciter 11 up to its normal operating speed. As soon as the generated voltage of the exciter 11 reaches a predetermined value, the operating coil 37 of an exciter-voltage relay 38 will be sufficiently energized to effect engagement of its contact members 39.

When the contact members 36 and 39 are engaged in response to a predetermined speed of the generator 2, and a predetermined generated voltage of the exciter 11, respectively, a circuit is completed extending through the secondary winding of the transformer 9, an actuating coil 40 of the circuit interrupter 7, the contact members 39 and 36, respectively, and a resistor 41. The coil 40 is thereby energized and so attracts its armature member 42 as to effect closing of the circuit interrupter 7. The closing of this circuit interrupter simultaneously connects the armature windings 8 of the generator 2 to the distribution circuit 1 and completes a circuit extending from the exciter 11 through auxiliary contact members 43 of the interrupter 7, to the field windings of the generator 2.

The voltage generated in the armature windings 8 of the generator 2 is thus automatically brought into proper phase relation with that of the distribution circuit 1 and the generator begins to supply energy to the distribution circuit under the control of the governor 4.

This operation continues as long as the load being carried by the generator 2 is sufficient to keep the water-wheel 3 operating within its range of relatively high efficiency. When the load decreases to such an extent that the water-wheel 3 is operating below this range, the governor 4 will have decreased the opening of the gate valve 6 to such an extent that a bridging member 44 that is supported on the controlling lever of the gate valve engages contact members 45 and 46. A circuit is thereby completed extending through the secondary winding of the transformer 9, the operating coil 47 of a time-element relay 48 and the contact members 31.

If the contact members 45 and 46 are held in engagement by the bridging member 44 for a predetermined interval of time, the relay 48 will effect engagement of contact members 49. This completes a circuit shunting the operating coil 25 of the master relay 26 through the contact members 49 and 31. The coil 25 is thus de-energized to permit the relay 26 to effect disengagement of the contact members 28, 29, 30 and 31, respectively.

Contact members 51, which are held in engagement when the circuit interrupter 7 is in its closed position, so shunt the contact members 30 that the motor 10 continues to drive the exciter 11 after the operating coil 25 of the master relay is de-energized. The generator 2 thus continues to supply energy to the distribution circuit 1 until the circuit interrupter 7 opens.

When the contact members 29 are disengaged, the circuit extending through the operating coil 32 of the governor solenoid is broken to permit the governor 4 to slowly close the gate valve 6. The energy input to the water-wheel 3 is thereby slowly decreased and the energy supplied by the generator 2 to the distribution circuit 1 is proportionately decreased until it becomes zero. A contact member 50 is so placed that the bridging member 44 effects engagement of the contact members 45 and 50 when the energy passing between the generator 2 and the distribution circuit 1 has become zero. The engagement of the contact members 45 and 50 completes a circuit shunting the operating coil 40 of the circuit interrupter 7, thereby de-energizing the coil 40 and permitting the circuit interrupter 7 to return to its open position. The armature windings 8 of the generator 2 are thereby disconnected from the distribution circuit 1 and the exciter 11 is disconnected from the field windings of the generator 2.

The governor 4 now continues to close the gate valve 6 until the supply of energy to the water-wheel 3 is completely cut off, when the operation of the water-wheel 3 and the generator 2 ceases. The generating station apparatus is now in its inoperative condition, as before the frequency relay 12 started it in operation, and is, as before, ready to respond to a reduction of frequency in the distribution circuit 1.

The apparatus embodying my invention is not limited to the application described above and shown in the accompanying diagram, but is suited to be used in various capacities, as set forth in the appended claims.

I claim as my invention:

1. The combination with a generator, a prime mover for driving said generator, a source of energy supply for said generator, means for controlling the energy supply to said generator comprising a governor and a valve controlled thereby, a circuit breaker for connecting the generator to the line, of means comprising a limit switch operable by said valve for actuating said governor when the latter has been in a position to supply energy to said prime mover at less than a predetermined rate for a predetermined time, whereby said govenor moves the valve to a position at which no energy is supplied from the generator to said circuit, and means comprising another limit switch operable by said valve for causing the opening of said circuit breaker when said valve has moved to said position.

2. The combination with an electric circuit, a generator, and means for connecting them, a prime mover for the generator and a source of energy therefor, a gate valve for controlling the rate of energy supply to the prime mover, a governor for actuating the gate valve to different positions, and a solenoid for controlling the operation of the governor, of a limit switch operable by said valve, means comprising a relay responsive to said limit switch for causing the deenergization of said solenoid when the govenor has been in a position to supply energy to the prime mover at less than a predetermined rate for a predetermined time, whereby the gate valve is thereupon actuated to the position in which no energy is supplied to the circuit by the generator, and means comprising an additional limit switch operable by the valve and operable when no energy is supplied to said circuit by the generator for causing the operation of said connected means to disconnect the generator from the circuit.

3. In an electrical system, the combination with a circuit, a generator for supplying energy thereto, connecting means between said circuit and said generator, a prime mover for the generator, a source of energy supply for the prime mover, a gate valve for controlling the supply of energy to the prime mover, a governor for controlling the position of said gate valve, a solenoid for controlling the operation of the governor, a circuit including said solenoid, and a time-element relay for controlling the circuit of said solenoid. a circuit for said relay, of a limit switch mounted on said gate valve to complete the circuit to said time-element relay when the gate valve assumes a position such that energy is admitted to the prime mover at a predetermined rate, whereby the governor after a predetermined time gradually closes the gate valve to the point where no energy is supplied to the circuit by the generator, and means comprising an additional limit switch also mounted on the gate valve, for opening the connecting means between the line and the generator, said means being operable when no energy is supplied to said circuit by the generator.

In testimony whereof, I have hereunto subscribed my name this 12th day of October, 1923.

MAURICE E. REAGAN.